March 13, 1956 C. S. CLARKE 2,737,936
INTERNAL COMBUSTION ENGINE
Filed Feb. 9, 1953
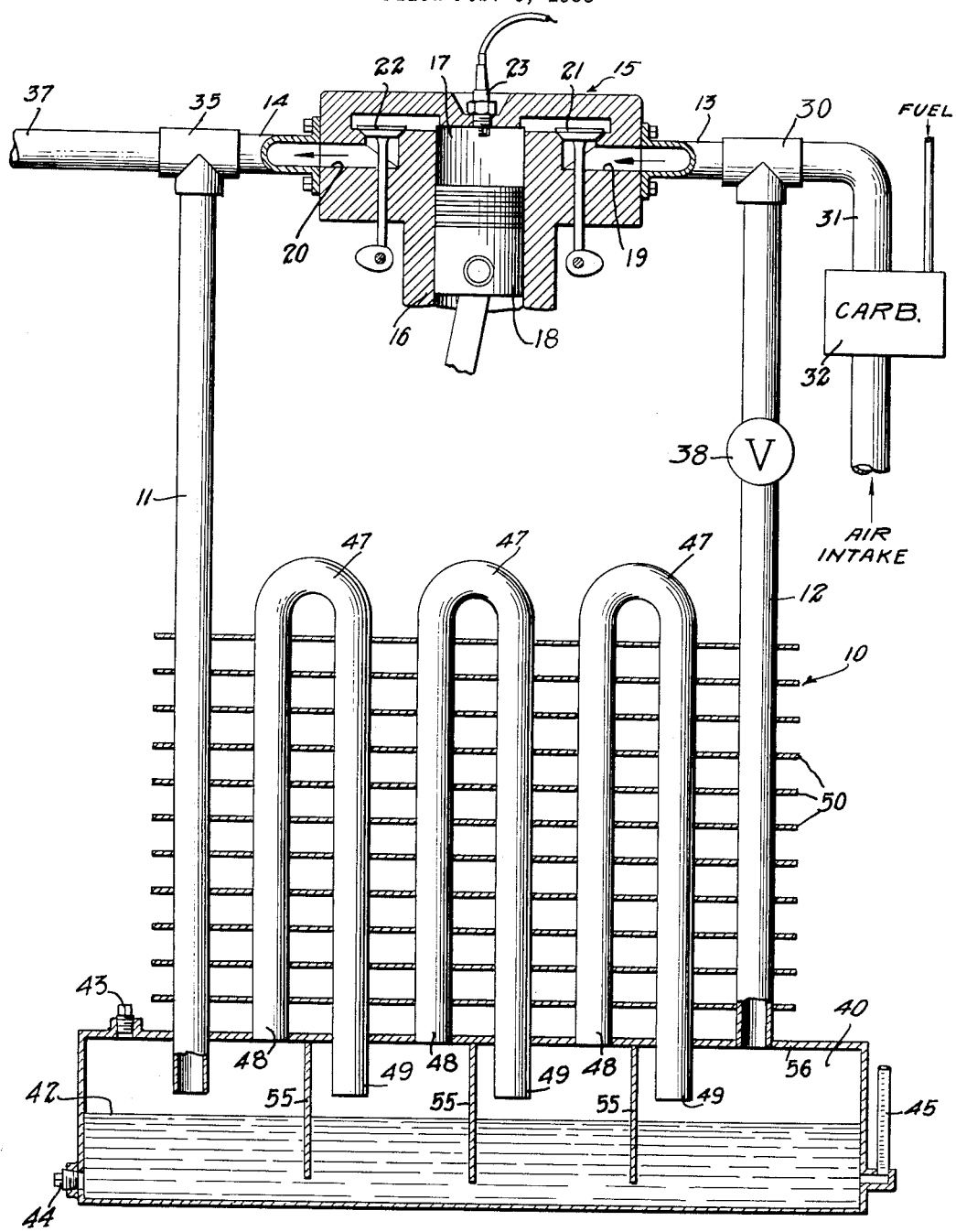
CLEMENT S. CLARKE
INVENTOR.
BY
ATTORNEYS

United States Patent Office 2,737,936
Patented Mar. 13, 1956

2,737,936
INTERNAL COMBUSTION ENGINE
Clement S. Clarke, Shreveport, La.

Application February 9, 1953, Serial No. 335,960

9 Claims. (Cl. 123—119)

This invention relates to internal combustion engines and has particular reference to a method and apparatus for the reintroduction of a portion of the exhaust gases from an internal combustion engine into the combustion chamber thereof.

The principal object of this invention is to provide a method and apparatus for the production of a new fuel mixture for utilization in an internal combustion engine.

Another object of this invention is to provide a novel method and apparatus wherein a portion of the exhaust gases from an internal combustion engine is reintroduced into the combustion chamber thereof in homogeneous mixture with the conventional fuel-air mixture.

Another object of this invention is to provide a novel method and apparatus for the reintroduction of a portion of the exhaust gases from an internal combustion engine into the combustion chamber thereof, resulting in prevention of rapid oxidation, preignition and detonation or knocking.

Many attempts have been made in the past to utilize the inert qualities of exhaust gas in combustion chambers to suppress detonation through the dilution of the fuel-air mixture. Such attempts have never heretofore been wholly successful, due in part at least to the use of excessively hot exhaust gases and to the detrimental effect of some of the products of combustion present in the exhaust gases. It has been found that exhaust gases may be effectively utilized if they are cooled and cleansed of harmful products, mainly solid particles of free carbon, water and the like, before being reintroduced into the combustion chamber along with the fuel-air mixture.

Accordingly, an important object of this invention is to provide a method and means for the utilization of exhaust gases in the combustion chamber of an internal combustion engine, which comprises cooling and cleansing the combustion products before they are reintroduced into the combustion chamber.

Another object of this invention is to provide a method and means for simultaneously cooling, removing water vapor from and cleaning exhaust gases prior to introduction thereof into the combustion chamber of an internal combustion engine.

Other objects and advantages of this invention it is believed will be readily apparent from the following detailed description of a preferred embodiment thereof when read in connection with the accompanying drawing.

In the drawing the single figure is a diagrammatic view of a device embodying the invention.

Referring now to the drawing, a combination cooling and cleansing unit is generally indicated 10 and is shown operably connected by means of inlet and outlet conduits 11 and 12 to the intake and exhaust manifolds 13 and 14 respectively of a conventional internal combustion engine, a portion of which is generally indicated 15. The engine is conventionally provided with at least one cylinder 16 forming a combustion chamber 17, a piston 18, inlet and outlet ports 19 and 20 respectively controlled by valves 21 and 22, and a spark plug 23.

A T fitting 30 is provided, to which are connected the outlet conduit 12, the intake manifold 13 and the fuel-air intake line 31 extending from the carburetor 32. Similarly, a T fitting 35 is provided on the exhaust side, to which are connected the inlet conduit 11, the exhaust manifold 14 and the conventional exhaust line or pipe 37.

The unit 10 includes a closed tank 40 into which leads the inlet conduit 11 and from which extends the outlet conduit 12 which is here provided with a valve member 38. A charge of liquid cleaning agent 42, which may consist of water, kerosene, other oils, etc., is provided in the tank 40 which is further provided with suitable filling and drain plugs 43 and 44 and a gauge glass 45. A heat exchange section is provided as a part of the unit 10 and comprises a plurality of U-shaped tubes 47 having inlet and outlet ends 48 and 49 leading into and away from the tank 40 above the surface of the liquid. A plurality of horizontal cooling fins 50 interconnects the exterior surfaces of the tubes 47 and the inlet and outlet conduits 11 and 12. Vertical partitions 55 extend downwardly from the top wall 56 of the tank and separate the inlet and outlet ends of each of the tubes 47 to prevent channeling of the gases.

In operation, a portion of the exhaust gases from the combustion chamber 17, the quantity depending upon the adjustment of the valve 38, is forced down the inlet conduit 11, into the tank 40, and thence upwardly and downwardly through the respective tubes 47, and with each pass coming into contact with the surface of the liquid 42, whereby substantially all of the solid particles of free carbon and the like in the gases are removed. The water vapor in the exhaust gases is condensed on the surfaces of the tubes 47 and drains downwardly into the tank 40, and at the same time the exhaust gases are cooled by heat exchange with the surrounding atmosphere. It will be understood that the temperature of the exhaust as it emerges from the combustion chamber 17 is of the order of 1500° F. or more, and preferably it is cooled by the unit 10 to a temperature of from about 80° to about 100° F. The gases which are delivered through the outlet conduit 12 are now cooled and cleansed and the introduction thereof into the air-fuel mixture results in more efficient engine operation.

It has been found that in using a radiator type of atmospheric air heat exchanger that the cooling surfaces should be of sufficient area to cool the exhaust gases to a temperature in direct relation to the variable temperatures of the intake air. An excessive area is to be preferred, as in no case would the radiator cool the exhaust gases below the air temperature. If the exhaust gases are cooled to the relative temperature of the intake air, the problem of carburetion is simplified.

It has been found that in an exhaust manifold of an internal combustion reciprocating engine, there is a variance of pressure above atmospheric, dependent upon the load and revolution, and in some installations it may require that a pressure regulating valve be placed in the system used to cool and cleanse the exhaust gas, in order to establish a relative static system pressure for the benefit of properly metering these gases for reintroduction into the combustion chamber.

It has also been found in some installations that it may be advantageous to withdraw the exhaust gases from the exhaust system at a point in the system at the greatest distance from the combustion chamber; then these gases will have been partially cooled and cleansed and a lesser load will be required of the cooling and cleansing system.

It has been found that by utilizing sufficient of the cooled and cleansed exhaust gases (the amount of same being dependent upon the engine's compression ratio and the fuel used, which amount may vary from 1% to 20% by volume of the fuel-air exhaust gas mixture) more efficient engine operation is possible. The inert exhaust gases act as a diluent in the combustion mixture forming a material barrier between the hydrocarbons and the oxygen, preventing the rapid oxidation of the hydrocarbon fuel, and thus causing the flame front to slowly propagate in a uniform manner, preventing detonation, preignition and increasing the thermal efficiency.

A brief analysis of the products of hydrocarbon-air combustion follows:

The atmospheric air used in a fuel mixture is a mechanical mixture of 77% by volume nitrogen, 21% oxygen, and small amounts of argon, carbon dioxide, water vapor, trace amounts of ammonia, sulphur dioxide, nitric acid, etc., and is of a remarkably constant composition.

The liquid hydrocarbon mainly used in the fuel-air mixture is a variable mixture of hydrocarbons, methane, ethane, propane, butane, etc. They vary dependent upon their crude oil source and the methods of refining used in their production. Trace products also exist, such as sulphur, etc. Various liquid additives are also used, such as tetraethyl lead, etc.

The composition of exhaust products of combustion will of course vary, dependent upon the fuel-air ratio, the composition of the hydrocarbon used and any additives thereto.

The over-all volume of a fuel-air mixture is approximately the same as the over-all volume of the products of combustion when the products of combustion are cooled to the same temperature as the fuel-air mixture prior to combustion and the volumes measured under the same pressures.

When one gallon of liquid hydrocarbon is mixed with air to form a fuel mixture and then burned, there is formed in the exhaust products, water vapor which if condensed will be one gallon of water with trace products.

If the condensing of the water vapor is accomplished in the presence of the other products of combustion a small amount of the carbon dioxide ($CO_2$) will combine with the water and form carbonic acid ($H_2CO_3$) (ferric corrosive).

If the hydrocarbon fuel contains sulphur (S) as an impurity and it is found in trace amounts in most fuels, hydrogen sulphide ($H_2S$) may be formed or sulphur dioxide ($SO_2$) or sulphur trioxide ($SO_3$) or sulfuric acid ($H_2SO_4$). Sulphur and hydrogen sulfide are also found in the atmospheric air.

The following are combustion gases present in variable volumetric amounts dependent upon fuel-air ratios and type of engine used: nitrogen ($N_2$) 70% to 85%, methane ($CH_4$), etc., .2% to .5%, carbon dioxide ($CO_2$) 6% to 14%, carbon monoxide (CO) 0% to 8%, oxygen ($O_2$) 0% to 4%, hydrogen ($H_2$) 0% to 4%, in chemically correct combustion the three latter gases would not be present.

Cooling of the exhaust gases is a prerequisite prior to their reintroduction into the combustion chamber, as the thermal efficiency of the combustion chamber depends upon rapid transmission of heat therefrom and any additional latent heat of the exhaust gases would tend to cause preignition, detonation, and increase the flame front propagation, causing ineffective operation.

It is known that the higher the compression ratio, the better the job of scavenging is performed in a four cycle reciprocating type internal combustion engine, and, due to this fact, with the same bore and stroke, an increase in the compression ratio gives an increase in power, as a larger fuel charge is taken into the combustion chamber. It may be asked why in a lower compression engine, where there is present in the combustion chamber a larger residual charge of exhaust gases, these gases do not tend to retard the propagation of the flame front and thereby increase the thermal efficiency. These residual exhaust gases do have this characteristic, but they also have extreme latent heat, which heat offsets their beneficial properties. This well illustrates the necessity for cooling the exhaust gases before reintroduction.

Cleaning of the exhaust gases is also a prerequisite prior to their reintroduction into the combustion chamber. Free carbon must be separated out as carbon black, as it tends to clog conduits and orifices, and if allowed to pass into the combustion chamber forms a harmful residual deposit; water vapor must be separated out as water, as it tends to interrupt the proper proportioning of the exhaust gases used, and, if introduced into the combustion chamber, has a detrimental effect on the valves and the combustion chamber. Additionally, water further forms a detrimental piston weight load in a reciprocating engine.

It has been found that the method and apparatus of this invention permits effective and efficient no-knock operation of an internal combustion engine with a fuel of lower octane rating than that for which the engine was originally designed. It is, of course, true that in such cases partial reduction of power is obtained due to reduction of fuel charge. It will be readily apparent to those skilled in the art that this loss in power may be overcome by changing the cylinder head to provide a higher compression ratio, or by supercharging, etc.

The method and means of this invention permits designing of higher compression engines which will produce greater thermal efficiency and more power per weight than present day engines and will also permit the use of present day engines designed for tetraethyl leaded gasoline to be operated on non-leaded gasoline of lower octane number.

It has been found that the exhaust gases to be used in the combustion chamber may be introduced therein as follows:

Direct introduction into the combustion chambers;
Mixed with the air and thereafter mixed with the fuel;
Mixed with the fuel and thereafter mixed with the air;
Mixed with the fuel-air mixture;
Mixed with the air and introduced into the combustion chamber and therein mixed with the fuel as for a diesel engine;
Mixed with the fuel and introduced into the combustion chamber and therein mixed with the air as for a diesel engine.

As is well known in the art, the higher the compression in the combustion chamber, the greater the thermal efficiency, and high compression ratios have had to wait until the oil industry has been able to produce a suitable gasoline fuel, until at the present time a quantity fuel of an octane number suitable for an 8 to 1 compression ratio is commercially available. However, with my new fuel mixture, a compression ratio of at least 12 to 1 may be obtained with this present fuel.

While I have illustrated a means of cleansing and cooling the exhaust gases by means of a liquid cleansing agent in conjunction with a cooling unit, this may also well be accomplished by separate and/or multiple units using electrical, mechanical or chemical means now known in the art.

While I have fully described the preferred embodiment of my invention, it is to be understood that I do not wish to be limited to the details herein set forth, but my invention is of the full scope of the appended claims.

I claim:

1. A method for the treatment of exhaust gases from a hydrocarbon-air combustion chamber, which comprises the steps of cooling a portion of the exhaust gases from the high temperature of combustion to a temperature of about 100° F. or below, removing substantially all water from said exhaust gases, removing entrained solid particles from said exhaust gases, and introducing the cooled and cleansed gases into the combustion chamber in admixture with the hydrocarbon-air fuel mixture in sufficient volume to suppress detonation and retard the propagation of the flame front, said volume being not greater than about 20% of the total intake mixture.

2. A method for the treatment of exhaust gases from a hydrocarbon-air combustion chamber, which comprises the steps of cooling a portion of the exhaust gases from the high temperature of combustion to a temperature approximately equal to that of the intake air to said combustion chamber, removing and separating substantially all water from said exhaust gases, removing entrained solid particles from said exhaust gases, and introducing the cooled and cleansed gases into the combustion chamber in admixture with the hydrocarbon-air fuel mixture in sufficient volume to suppress detonation and retard the propagation of the flame front, said volume being not greater than about 20% of the total intake mixture.

3. The steps in a method of providing a hydrocarbon-air-inert gas mixture for the combustion chamber of an internal combustion engine for preventing rapid oxidation, pre-ignition and knocking, comprising cooling hot exhaust products of combustion from the combustion chamber to temperatures substantially equivalent to the variable temperatures of the intake atmospheric air used by the engine and simultaneously with the cooling action condensing substantially all water vapor contents from the hot products of combustion and thereby producing inert gases, subsequently homogeneously admixing said cooled and dehydrated inert gases with a combustible hydrocarbon-air fuel mixture in proportion by volume up to 20% of said inert gases with respect to the total volume of the resultant mixture, and introducing said resultant mixture into the combustion chamber.

4. The steps in a method of providing a fuel-air-inert gas combustion mixture for retarding oxidation, preventing pre-ignition and detonation, which consists in cooling an internal combustion engine's product of combustion from their hot exhaust temperature to a temperature substantially that of the temperature of the intake air, condensing substantially all of the water vapors therefrom to provide cooled dehydrated inert gases, and subsequently mixing said inert gases with a combustible hydrocarbon-air mixture in sufficient volume for introduction into a combustion chamber for suppressing detonation and retarding the propagation of the flame front in the combustion chamber.

5. In apparatus for the preparation of an internal combustion engine's hydrocarbon air mixture for retarding oxidation, prevention of pre-ignition and detonation, the combination with an internal combustion engine having a combustion chamber of atmospheric air heat exchanger having an unobstructed internal flow passageway with only directional course changes of a construction for dissipating heat by conduction, convection and radiation, means for passing products of combustion from the internal combustion engine through said heat exchanger along said flow passageway for cooling said products of combustion to temperatures substantially the same as the temperature of the atmospheric air used in the fuel-air mixture, means for condensing for refuse disposal the condensates from the exhaust products of combustion passing through said heat exchanger, means for admixing the resultant cooled and dehydrated inert gases from the heat exchanger with a hydrocarbon air mixture in which the volume of inert gases range from 20% downward with respect to the total intake volume of the resultant fuel mixture, and means for feeding said resultant fuel mixture to the combustion chamber of the internal combustion engine.

6. Apparatus as described in claim 5 in which the heat exchanger cools the exhaust products to a temperature of 100° F. or below.

7. Apparatus as described in claim 5 in which regulating valve means is provided for proportioning the flow of inert gases through the heat exchanger and dehydrator.

8. The steps in the process of producing a fuel charge for the combustion chamber of an internal combustion engine which consists in taking the hot products of combustion from an internal combustion engine, cooling the said products to a temperature below the dew point temperature of water, and simultaneously removing substantially all of the water from said products to produce inert gases, mixing said inert gases with a hydrocarbon-air mixture in a proportion of not greater than 20% of the total fuel intake charge of the combustion chamber of the internal combustion engine, and feeding the resultant mixture charge to the combustion chamber.

9. A process to be used to cool and refine exhaust products of combustion from an internal combustion engine whereby the end product is a cool dehydrated inert gaseous mixture to be used to admix in a homogeneous manner with the fuel-air mixture of the engine by the following steps, cooling under all operating conditions to a temperature of 100° F., or below, a portion of the exhaust products of combustion through conduction, convection and radiation to the atmospheric air, simultaneously condensing for refuse disposal substantially all of the vapors of combustion in said portion, and regulating the quantity of inert gases to increase or decrease the overall volumetric flow.

References Cited in the file of this patent

UNITED STATES PATENTS

| | | |
|---|---|---|
| 885,857 | McIlhenny | Apr. 28, 1908 |
| 1,072,133 | Lyle | Sept. 2, 1913 |
| 1,296,115 | Pfeifer | Mar. 4, 1919 |
| 1,529,351 | Grooms | Mar. 10, 1925 |
| 1,750,342 | Bailey | Mar. 11, 1930 |
| 1,756,897 | Bilsky | Apr. 29, 1930 |
| 1,911,922 | Nottebohm | May 30, 1930 |
| 1,961,444 | Lewis | June 5, 1934 |
| 2,069,389 | Peebles | Feb. 2, 1937 |
| 2,087,411 | Lundquist | July 20, 1937 |
| 2,099,802 | Ewing | Nov. 23, 1937 |
| 2,139,827 | Johnstone et al. | Dec. 13, 1938 |
| 2,256,374 | Cummings, Jr. | Sept. 16, 1941 |
| 2,300,774 | Cartmell | Nov. 3, 1942 |
| 2,424,614 | Hann et al. | July 29, 1947 |

FOREIGN PATENTS

| | | |
|---|---|---|
| 998,800 | France | Sept. 26, 1951 |